Oct. 19, 1948. H. S. EAGLE 2,451,723
GEARING CONNECTING OPPOSITELY ROTATING SHAFTS
Filed March 4, 1944 2 Sheets-Sheet 1

Inventor
H. S. Eagle

Patented Oct. 19, 1948

2,451,723

UNITED STATES PATENT OFFICE 2,451,723

GEARING CONNECTING OPPOSITELY ROTATING SHAFTS

Harold Stanley Eagle, Strathfield, near Sydney, New South Wales, Australia

Application March 4, 1944, Serial No. 525,072
In Australia March 4, 1943

1 Claim. (Cl. 74—389)

This invention relates to the rotation of contra rotatable shafts specially applicable to contra rotatable propeller shafts of aircraft and watercraft which include aerial and aquatic torpedoes, and the invention has been specially devised in order to overcome and absorb by equalisation the torque arising from the rotation in same direction of power shafts driving contra rotatable propeller shafts.

The improved method consists in rotating each of a pair of power shafts in contra direction to the other by opposed pistons in a common cylinder reciprocated by a common combustion, applying or transmitting the rotations thereof to respective propeller shafts, and synchronising the rotations of each pair of the power shafts.

The improved means for rotating a pair of contra rotatable propeller shafts consist in the combination and arrangement of an engine in which each of each pair of pistons is arranged to be moved away from each other by a common combustion in a combustion area between the inner sides of the two pistons in the accommodation portions of a common cylinder, and is connected to one of a pair of power shafts, means for applying or transmitting the contra rotations of the power shafts to respective contra rotatable propeller shafts, and means for synchronising the rotations of the power shafts.

Figure 1:
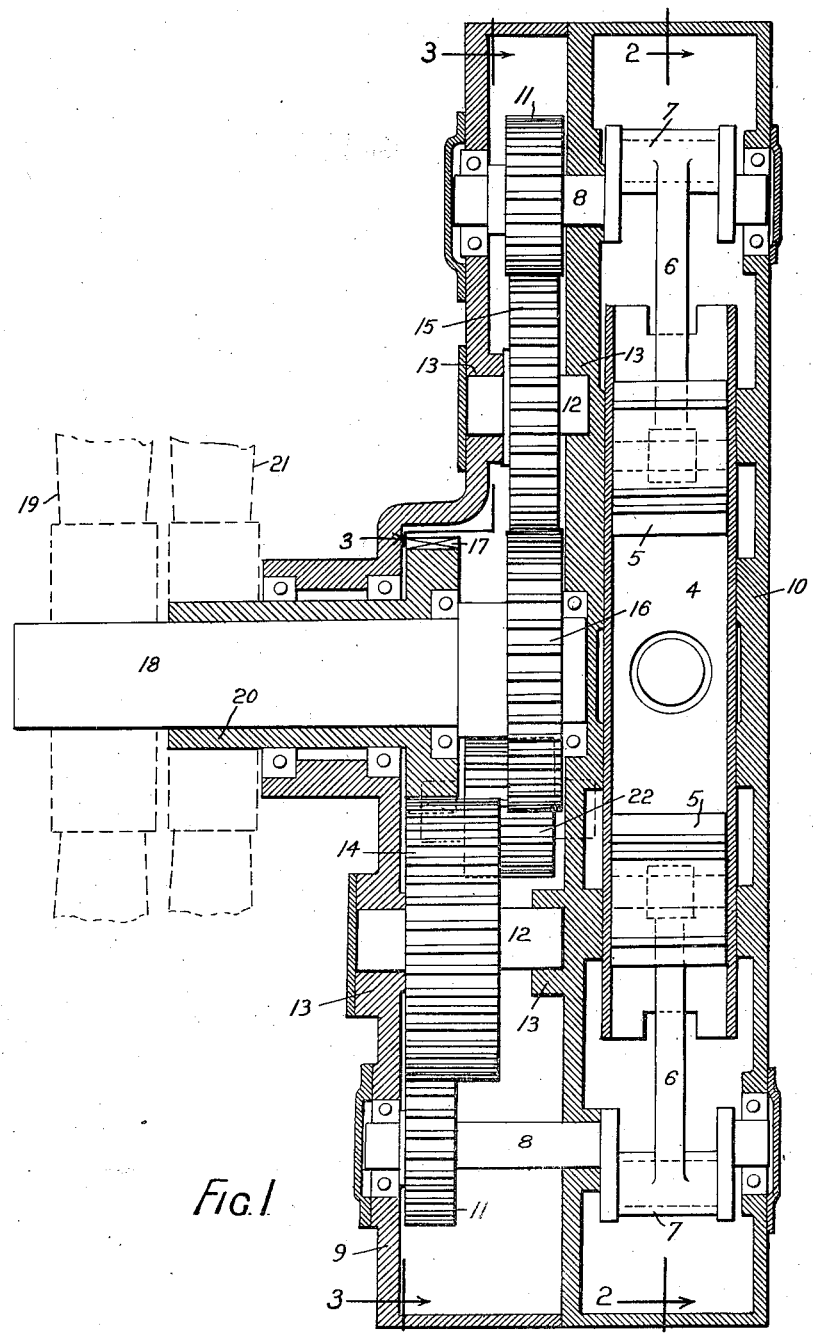
Figure 2:
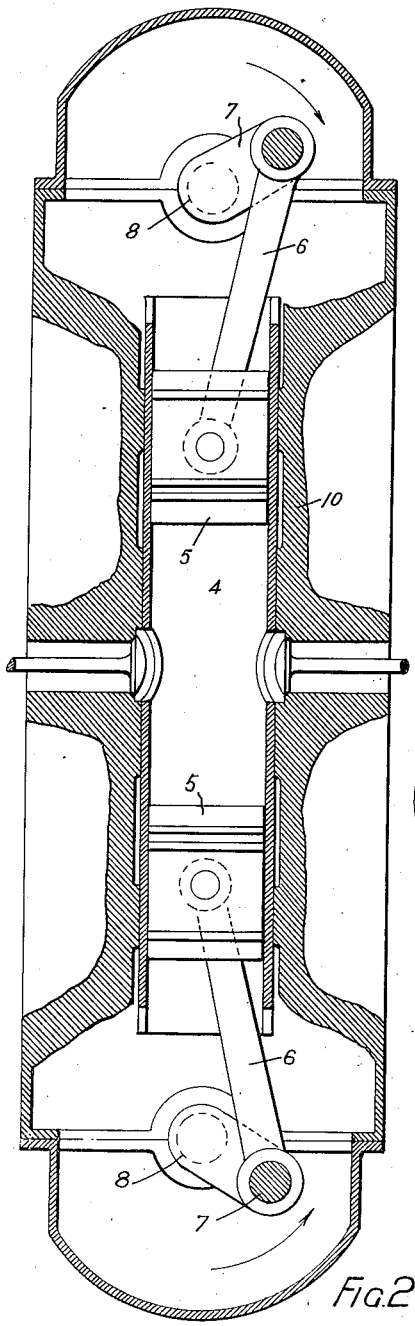
Figure 3:
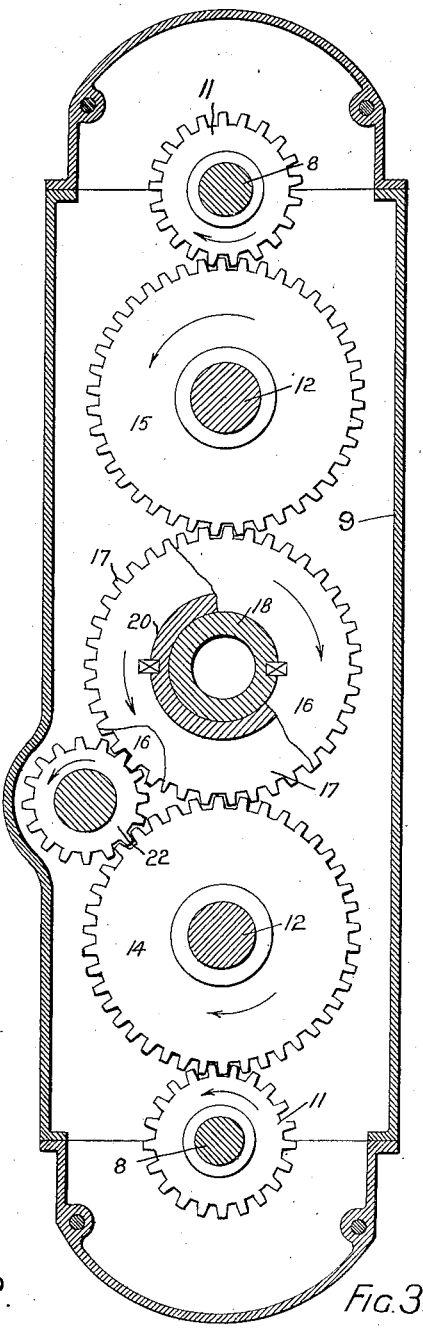

And in order that a practical application of the improvements and the means therefor will be readily understood the same will now be described with reference to the accompanying drawings in which:

Figure 1 is a longitudinal central section of a practical combination and arrangement of suitable engine or power unit and the transmission means, and Figures 2 and 3 are cross sections on the lines 2—2 and 3—3 respectively in Figure 1.

A common engine cylinder 4 has therein opposed and oppositely functioning pistons 5 that is pistons which will move from each other in the forward or outward throw and each is connected by a rod 6 to a crank 7 of a power shaft 8, such cranks being arranged or set at requisite radial angular position in relation to each other so that each shaft will be rotated in contra direction to the other.

If desired the crank or cranks of one power shaft of each pair thereof each of which shafts is arranged to be rotated contrary to the other may be set or arranged suitably in advance of the crank or cranks of the other power shaft.

In a suitable gear case 9 formed with or secured to the cylinder block 10, and/or attached to the crank cases, are mounted a driving pinion 11 upon each power shaft 8, and upon shafts or axles 12 in bearings 13 are idler gears 14 and 15 in laterally spaced planes, the former 14 being wide enough to overlap a gear of similar width in the same plane as 15, each idler meshing with adjacent laterally spaced gears 16 and 17 upon the inner and outer associated or concentric shafts 18 and 20 which carry the outer and inner propellers 19 and 21, and an overlapping synchronising gear 22 which is of like width to gear 14 is mounted and so positioned that it will overlap and mesh therewith and with gear 16, but will be clear of gear 17, in order that the set radial angular relation of the cranks of the power shafts 8 will be synchronised and maintained, and power from said shafts to the driven or propeller shafts 18 and 20 will be equalised.

I claim:

In combination a pair of mutually contra rotatable power shafts, a pair of mutually contra rotatable driven shafts, means for transmitting rotation from the power shafts to the driven shafts and for synchronising the rotation of said power shafts, said transmitting means including a gear on each power shaft, an idler gear in mesh with each power shaft gear, a gear fixed upon each driven shaft, one driven shaft gear meshing with one idler gear and the other driven shaft gear meshing with the other idler gear, and an overlapping idler gear in mesh with one of the first mentioned idler gears and with one of the driven shaft gears.

HAROLD STANLEY EAGLE.

REFERENCES CITED

The following references are of record in the file of this patent:

UNITED STATES PATENTS

| Number | Name | Date |
|---|---|---|
| Re. 17,218 | Kasley | Feb. 19, 1929 |
| 968,127 | Cloud | Aug. 23, 1910 |
| 1,091,427 | De Lukaserics | Mar. 24, 1914 |
| 1,837,870 | Johnston | Dec. 22, 1931 |
| 1,858,911 | Zerbi | May 17, 1932 |
| 2,229,153 | Ware | Jan. 21, 1941 |
| 2,305,454 | Nallinger et al | Dec. 15, 1942 |
| 2,311,254 | Raybon | Feb. 16, 1943 |